United States Patent [19]
Kidzun et al.

[11] Patent Number: 5,632,562
[45] Date of Patent: May 27, 1997

[54] BEARING ASSEMBLY FOR SUPPORTING A SHAFT WITHOUT PLAY

[75] Inventors: Dirk Kidzun; Herbert Rost; Herbert Zettner; Herbert Eberhardt, all of Herzogenaurach, Germany

[73] Assignee: INA Wälzlager Schaeffler KG, Herzogenaurach, Germany

[21] Appl. No.: 548,905

[22] Filed: Oct. 26, 1995

[30] Foreign Application Priority Data

Nov. 15, 1994 [DE] Germany ............ 44 40 725.4

[51] Int. Cl.⁶ .................................. F16C 27/06
[52] U.S. Cl. .......................... 384/536; 384/582
[58] Field of Search ................... 384/215, 220, 384/222, 535, 536, 581, 582

[56] References Cited

U.S. PATENT DOCUMENTS

| | | | |
|---|---|---|---|
| 2,173,250 | 5/1939 | Fay | 384/536 |
| 2,893,790 | 3/1959 | Raes | 384/536 |
| 3,050,352 | 8/1962 | Moxley | 384/536 |
| 3,447,846 | 6/1969 | Marsh | 384/536 |
| 3,704,922 | 12/1972 | Kleinschmidt | 384/582 |
| 4,608,881 | 9/1986 | Tanoue | 384/541 X |
| 4,820,062 | 4/1989 | Shirane | 384/486 |
| 4,895,391 | 1/1990 | Groat | 280/779 |
| 5,044,785 | 9/1991 | Bair | 384/536 |

FOREIGN PATENT DOCUMENTS

| | | |
|---|---|---|
| 3 26 494 | 5/1973 | Austria . |
| 554144 | 8/1993 | European Pat. Off. . |
| 19 60 547 | 10/1966 | Germany . |
| 73 10 449 | 3/1973 | Germany . |
| 73 12 719 | 4/1973 | Germany . |
| 74 15 251 | 5/1974 | Germany . |
| 25 58 284 | 7/1976 | Germany . |
| 42 40 099 | 5/1994 | Germany . |

*Primary Examiner*—Thomas R. Hannon
*Attorney, Agent, or Firm*—Henry M. Feiereisen

[57] ABSTRACT

A bearing assembly for supporting a shaft without play, in particular for use with a steering shaft in a steering column, includes a plurality of needle-like rollers that are circumscribed by a thin-walled, split bush for elastically loading the rollers in radial direction. Fitted about the bush is an elastic ring that applies a preload on the bush and has at least one peripheral surface formed with neighboring ridges of relatively greater radial dimension and relatively smaller radial dimension in alternating relationship.

7 Claims, 4 Drawing Sheets

BEARING ASSEMBLY FOR SUPPORTING A SHAFT WITHOUT PLAY

BACKGROUND OF THE INVENTION

The present invention refers to a bearing assembly for supporting a shaft without play, and in particular to a bearing assembly for journalling a steering shaft in a steering column such as to prohibit lost motion therebetween.

U.S. Pat. No. 4,820,062 describes a bearing assembly for journalling the steering wheel shaft of a vehicle, including a number of needle-like rollers that are retained in a cage. The outer race of the rollers is circumscribed by a thin-walled bearing bush which elastically loads the rollers in radial direction. An elastic tolerance ring is press-fitted over the bearing bush and has a number of projecting ridges in equi-spaced parallel relation with one another on the peripheral surface in axial direction. As the outer diameter of the tolerance ring exceeds the inner diameter of the steering column, the elastic tolerance ring is squeezed during assembly of the bearing into the steering column, thereby being elastically deformed radially and inwardly to compress the internally fitted bearing bush in the radial and inward direction. Thus, when the bearing assembly is press-fitted into the steering column, the excess in diameter of the tolerance ring applies a preload on the slotted bush and thus on the rollers and the steering shaft so that a lost motion therebetween is prohibited.

When installing a bearing of this type in steering columns within a bore that has a maximum limit for a bearing seat, the applied preload is relatively small while a bore of minimum limit for a bearing seat effects a great preload. Thus, housings with bores of great tolerances result in significant variations of the preload. As a consequence of these tolerance variations, customers frequently experience that their demands are not met when installing the bearing in a bore of the steering column that has one or the other extreme size. Taking for example a steering column with a bore of minimum size, the preload of the bearing applied on the shaft may rise to such order that the torque and/or axial displacement force becomes prohibitive. Proposals to overcome this problem include the provision of the elastic tolerance ring with a ribbing for decreasing the preload. Conventionally, such a ribbing is formed by providing in the outer peripheral surface of the elastic tolerance ring a plurality of axial grooves that are evenly spaced about the circumference to thereby create between the grooves ridges of equal size which radially project from the outer peripheral surface. The previously addressed problem could however not be solved by the formation of such ridges because at great tolerances of the bore the bearing applies a preload on the shaft which is too low so that the radial displacement becomes prohibitive. Moreover, regardless whether the preload is too small or excessive, the attenuation behavior is adversely affected in any event.

SUMMARY OF THE INVENTION

It is an object of the present invention to provide an improved bearing assembly, obviating the aforestated drawbacks.

In particular, it is an object of the present invention to provide an improved bearing assembly for a steering mechanism by which a preload can act regardless of the magnitude of the tolerance between steering shaft and steering column in such a manner that the bearing exhibits, on the one hand, a slight torque and a slight force of axial displacement and, on the other hand, a slight radial displacement.

These objects and others which will become apparent hereinafter are attained in accordance with the present invention by circumscribing a plurality of needle-like rollers with a thin-walled bush for elastically loading the rollers in radial direction and fitting an elastic tolerance ring about the bush to apply a preload thereon, with the tolerance ring being formed on at least one of the inner and outer peripheral surfaces with a plurality of ridges in such a manner that ridges of relatively greater radial dimension and ridges of relatively smaller radial dimension are positioned in alternating relationship.

Through the alternating arrangement of neighboring ridges in accordance with the present invention, a maximum size tolerance and a minimum size tolerance between steering column and steering shaft can be compensated by the radially longer ridge while the radially shorter ridge serves as stop for limiting a lateral displacement of the longer ridge during deformation thereof. Depending on prevailing conditions, i.e. existing tolerance between the steering shaft and the steering column, the shorter ridge may either have no contact with the thin-walled bush or steering column (depending on which of the inner and outer peripheral surfaces is formed with ridges), or may bear at slight preload or at greater preload on the bearing bush or the steering column. Thus, the resistance against a deformation and complete compression of the shorter ridge limits the radial displacement of the shaft. The ribbing as formed by the ridges of different radial dimensions reduces the volume being displaced of the elastic tolerance ring so that, on the one hand, a smaller preload effects a smaller moment of friction and a smaller axial force of displacement of the bearing, while, on the other hand, the compression of the shorter ridge also limits the radial displacement of the bearing.

The configuration of the elastic tolerance ring in accordance with the present invention reconciles seemingly diametrically opposite requirements demanded from the bearing assembly, namely the provision of a slight moment of friction and a slight axial force of displacement, on the one hand, and a slight radial displacement, on the other hand. In contrast thereto, a conventional non-graduated ribbing is unable to reconcile these seemingly contradicting demands because a slight preload, though effecting a desired small moment of friction and small axial force of displacement of the bearing, will generate also an undesired excessive radial movement of the bearing. In the event of a high preload as applied by the bearing on the shaft, a non-graduated ribbing will result in a small radial displacement but also in a prohibitively high moment of friction and a prohibitively high axial force of displacement.

U.S. Pat. No. 5,044,785 discloses an elastic ring which circumscribes the outer bearing race of a ball bearing and includes about its inner periphery equally spaced energy absorbing pads and a plurality of stop pads in circumferentially alternating arrangement. Each of the stop means has a radially inner surface that extends outwardly from the inner surface of the energy absorbing pads. This prior art is concerned with the provision of an elastic ring for absorption of vibrations in radial direction. The use of the elastic ring in the context of a bearing assembly for a steering mechanism in order to affect the torque, axial displacement force and radial deflection is not addressed herein. As a matter of fact, the use of this conventional elastic ring in a bearing assembly for a steering shaft to influence the above parameters would actually be impossible because the radial extension of different circumferentially extending bearing surfaces is too great to enable an escape into the intermediate space formed between two successive bearing surfaces during press-fit in a housing. In other words, such an elastic ring is not suitable to compensate tolerances between a shaft and a housing.

The present invention thus teaches for the first time a bearing assembly for supporting a steering shaft, by which a specially configured elastic tolerance ring can be targeted to positively affect the parameters torque, axial displacement force and radial displacement in a desired fashion.

According to another, advantageous feature of the present invention, neighboring ridges define a free space or recess that has a depth that corresponds to the height by which the longer ridge projects beyond the shorter ridge in radial direction. Thus, an ideal condition during assembly of the bearing is accomplished when the longer ridge is squeezed for compensation of the tolerance between the steering shaft and the steering column such that the squeezed portion fits into the space between the neighboring ridges. In this case, the tolerance ring exhibits a continuous cross section and positively affects the radial displacement behavior.

Preferably, the longer ridges have a triangular cross section and the shorter ridges have a trapezoid cross section. Through this configuration of the ridges, the displaced squeezed volume of the longer ridges can be best suited to the free space that is defined by neighboring ridges because the formed free space, which receives the squeezed volume, and the adjacent longer ridge are of triangular configuration. Furthermore, the triangular apex of the longer ridges can easily be squeezed while the trapezoid configuration of the shorter ridges exhibits a wider contact surface which significantly resists a radial displacement of the bearing.

According to another embodiment of the present invention, the longer and shorter ridges may also be positioned about the circumference of at least one of the inner and outer peripheral surfaces such that a longer ridge is followed by two shorter ridges.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
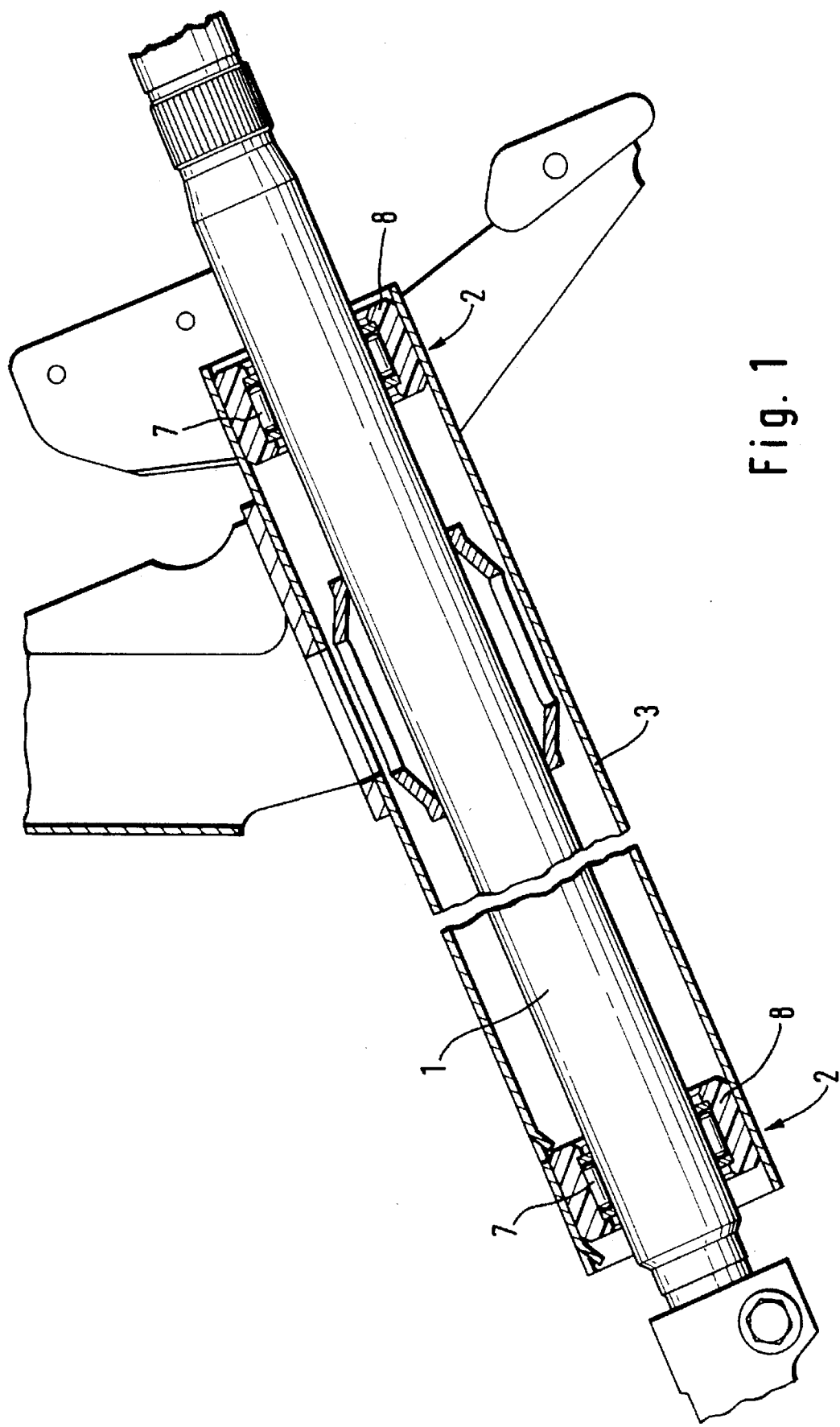
FIG. 1 is a longitudinal section of one embodiment of a bearing assembly according to the present invention in form of two needle bearings for supporting a shaft.

Throughout all the Figures, the same or corresponding elements are always indicated by the same reference numerals.

Figure 2:
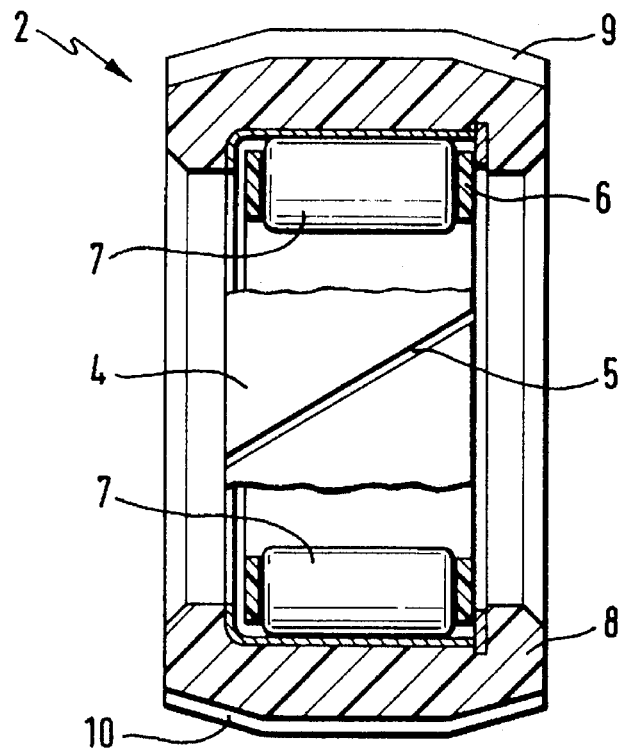
FIG. 2 is a partially sectional view of a needle bearing, on an enlarged scale, showing in detail a tolerance ring with a ribbing according to the present invention.

Turning now to the drawing, and in particular to FIG. 1, there is shown a longitudinal section of one embodiment of a bearing assembly according to the present invention in form of two needle bearings, generally designated by reference numeral 2, for supporting a steering shaft 1 within a steering column 3. As shown in particular in FIG. 2, each needle bearing 2 includes a thin-walled bearing bush 4 which is formed with a through-slit 5 that extends over its axial length at one area of its circumference. The inner periphery of the bush 4 forms a race for needle-like rollers 7 that are retained in a cage 6 and are in rolling contact upon the steering shaft 1. The split bush 4 is circumscribed by an elastic tolerance ring 8 for applying a preload on the needle-like rollers 7 so that a lost motion between the bearing 2 and the steering shaft 1 is prohibited.

Figure 3:
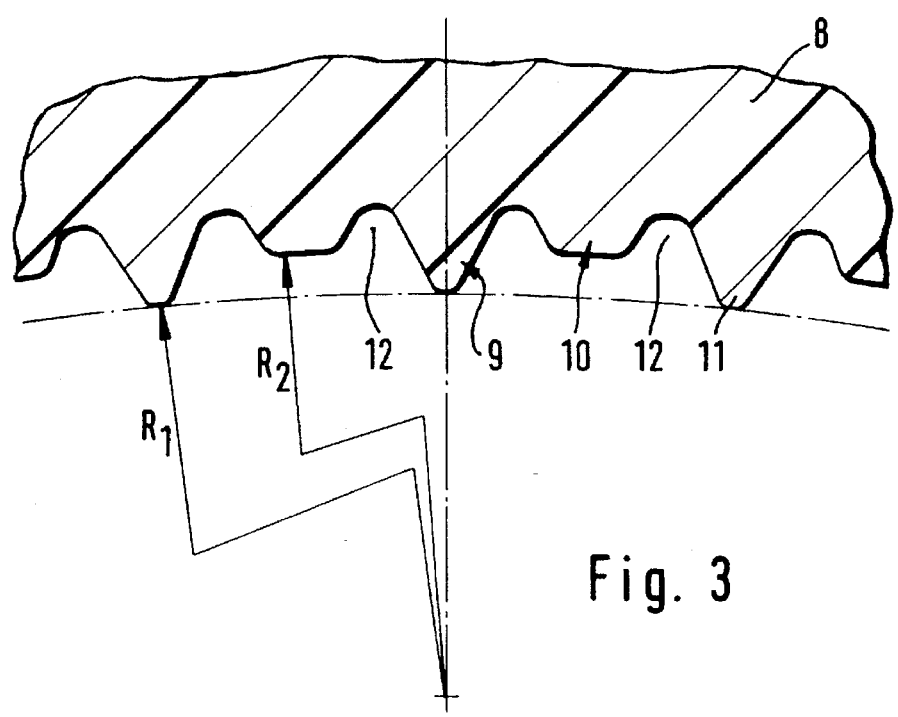
FIG. 3 is a fragmentary, sectional view of a tolerance ring with a ribbing about the inner periphery thereof.

As shown in particular in FIG. 3, the elastic tolerance ring 8 is provided at least about one of its inner or outer peripheries with knobs or ridges 9, 10 that neighbor each other in axial direction, such that a ridge 9 of greater radial distance adjoins a ridge 10 of shorter radial dimension in an alternating relationship, with the portion of the ridge 9 that exceeds the radial dimension of the ridge 10 being designated by reference numeral 11, and with two neighboring ridges 9, 10 defining a free space or recess 12 therebetween. FIG. 3 shows the tolerance ring 8 with the ridges 9, 10 formed about the inner periphery, whereby the ridges 9 have apexes that are lined about a circle defined by a radius $R_1$ while the crests of the ridges 10 are lined about a circle defined by a radius $R_2$ which is greater than the radius $R_1$. In the event, the ridges 9, 10 are formed on the outer periphery of the tolerance ring 8, the radius $R_1$ of ridges 9 is greater than the radius $R_2$ of ridges 10.

The longer ridges 9 are preferably configured of triangular cross section while the shorter ridges 10 exhibits a trapezoid cross section. Persons skilled in the art will understand that the depicted configuration of the ridges is only a preferred design, and it is certainly within the scope of the present invention to differently configure the ridges, such as e.g. rounded cross sectional configurations of different radii.

Upon securing the needle bearings 2 within the steering column 3 and fitting the steering shaft 1 to the needle bearings 2, the tolerances between the steering shaft 1 and the steering column 3 are compensated through squeezing the portion 11 of each ridge 9 into the adjacent recess 12 that is defined, on the one hand, by opposing flanks of neighboring ridges 9, 10 and, on the other hand, by the radius $R_2$ of the pertaining ridge 10. The ideal seat of the bearing upon the shaft 1 is effected when the portion 11 of the ridge 9 fully occupies the recess 12 so as to form the elastic tolerance ring 8 with a continuous cross section.

Figure 4:
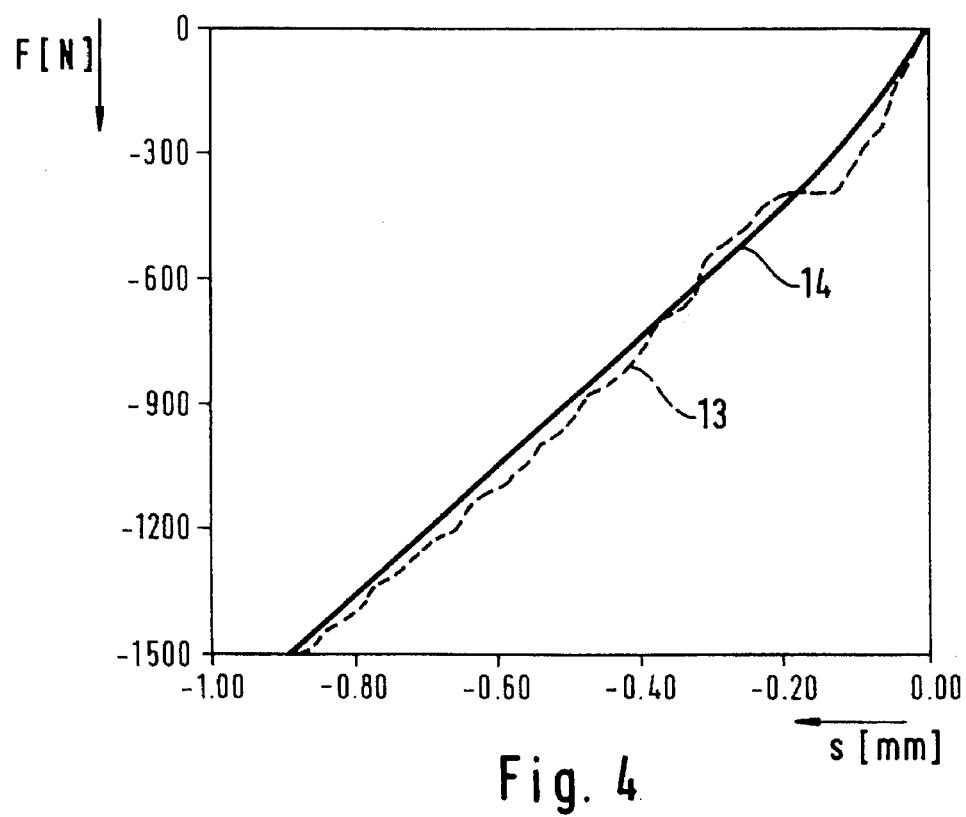
FIG. 4 is a graphical illustration of the radial displacement of a bearing assembly according to the present invention compared to a prior art bearing assembly, as a function of an applied load.
Figure 5:
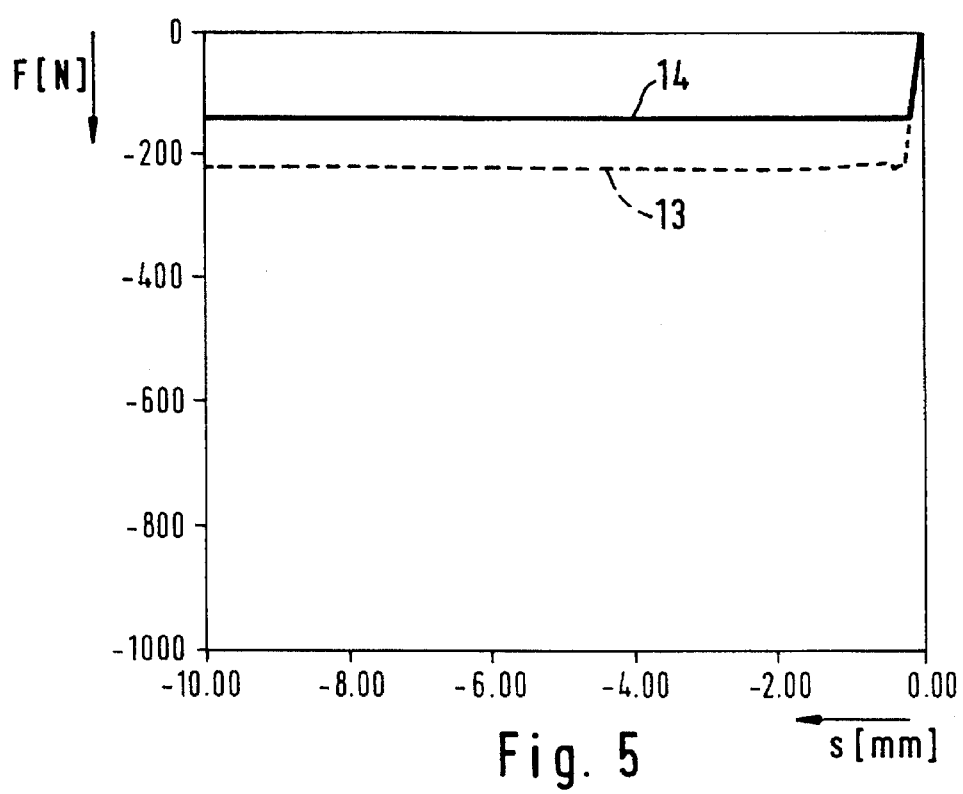
FIG. 5 is a graphical illustration of the axial displacement force of a steering shaft journalled by a bearing assembly according to the present invention compared to a support by a prior art bearing assembly, as a function of an applied axial force.

Turning now to FIG. 4, there is shown a graphical illustration of the radial displacement s of a bearing assembly according to the present invention, represented by curve 14, compared to a conventional bearing assembly, represented by curve 13, as a function of the applied load F. As exhibited by FIG. 4, the differences between the curves 13 and 14 are minor. FIG. 5 shows a comparison of same bearing assemblies with regard to the radial displacement as a function of the applied axial force F and clearly demonstrates that the curve 14, representing the bearing assembly according to the present invention, exhibits a smaller axial displacement force compared to a conventional bearing assembly represented by the curve 13.

Figure 6:
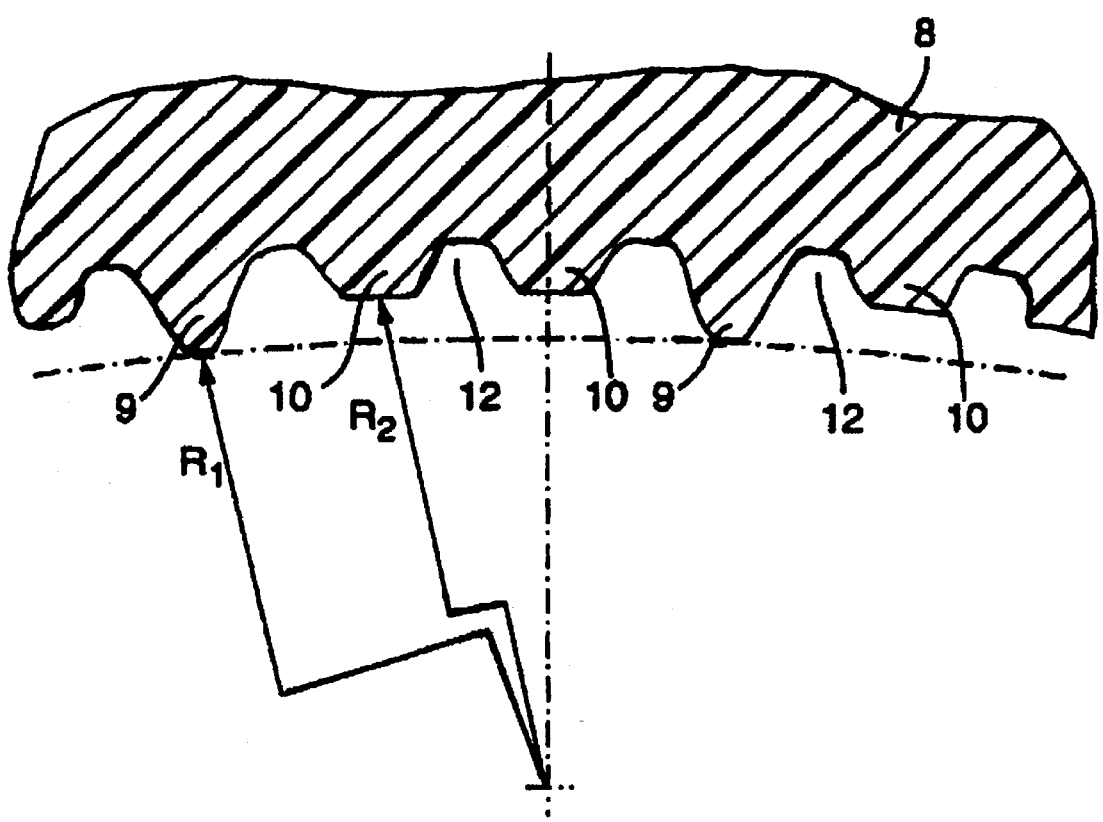
FIG. 6 is a fragmentary, sectional view of a tolerance ring according to the present invention, with a ribbing of modified configuration.

Turning now to FIG. 6, there is shown a variation of the ribbing about at least one of the inner and outer peripheries of the tolerance ring 8, whereby the ridges 9, 10 are arranged such that a ridge 9 of relative greater radial dimension is followed by two ridges 10 of relative smaller radial dimension.

While the invention has been illustrated and described as embodied in a bearing assembly for supporting a shaft without play, it is not intended to be limited to the details shown since various modifications and structural changes may be made without departing in any way from the spirit of the present invention.

What is claimed as new and desired to be protected by Letters Patent is set forth in the appended claims:

1. A bearing assembly for supporting a shaft without play, comprising:

a plurality of needle-like rollers;

a bearing bush circumscribing said needle-like rollers for elastically loading said rollers in a radial direction; and an elastic ring fitted on said bush to apply a preload on said bush, said elastic ring having at least one peripheral surface formed with ridges of relatively greater radial dimension and ridges of relatively smaller radial dimension wherein two neighboring ridges define a recess of a depth that corresponds to a portion by which a ridge of relatively greater radial dimension projects beyond a ridge of relatively smaller radial dimension.

2. The bearing assembly of claim 1 wherein said ridges of relatively greater radial dimension and said ridges of relatively smaller radial dimension are positioned in alternating relationship.

3. The bearing assembly of claim 1 wherein said ridges of greater radial dimension have a triangular cross section.

4. The bearing assembly of claim 1 wherein said ridges of smaller radial dimension have a trapezoidal cross section.

5. The bearing assembly of claim 1 wherein the bearing bush is of thin-walled split configuration.

6. A bearing assembly for supporting a shaft without play, comprising:

a plurality of needle-like rollers;

a bearing bush circumscribing said needle-like rollers for elastically loading said rollers in a radial direction; and an elastic ring fitted on said bush to apply a preload on said bush, said elastic ring having at least one peripheral surface formed with ridges of relatively greater radial dimension and ridges of relatively smaller radial dimension, wherein said ridges are positioned about the peripheral surface such that a ridge of relatively greater radial dimension is followed by two ridges of relatively smaller radial dimension.

7. A bearing assembly for supporting a shaft without play, comprising:

a plurality of needle-like rollers;

a bearing bush circumscribing said needle-like rollers for elastically loading said rollers in a radial direction; and an elastic ring fitted on said bush to apply a preload on said bush, said elastic ring having at least one peripheral surface formed with ridges of relatively greater radial dimension and ridges of relatively smaller radial dimension, said ridges of greater dimension having a triangular cross section.

* * * * *

UNITED STATES PATENT AND TRADEMARK OFFICE
CERTIFICATE OF CORRECTION

PATENT NO. : 5,632,562
DATED : May 27, 1997
INVENTOR(S) : Dirk Kidzun, et. al.

It is certified that error appears in the above-indentified patent and that said Letters Patent is hereby corrected as shown below:

Title page, item [75], Inventor: change "Eberhardt" to -- Erhardt --.

Signed and Sealed this

Twenty-first Day of October 1997

Attest:

BRUCE LEHMAN

Attesting Officer    Commissioner of Patents and Trademarks